United States Patent
Lee et al.

(10) Patent No.: US 10,468,700 B2
(45) Date of Patent: Nov. 5, 2019

(54) MEMBRANE-ELECTRODE ASSEMBLY FOR WATER ELECTROLYSIS

(71) Applicants: YUAN ZE UNIVERSITY, Taoyuan (TW); HOMYTECH CO., LTD., Taoyuan (TW)

(72) Inventors: Chi-Yuan Lee, Taoyuan (TW); Chia-Hung Chen, Taoyuan (TW); Guo-Bin Jung, Taoyuan County (TW); Yu-Chun Chiang, Taoyuan County (TW); Chin-Lung Hsieh, Taoyuan (TW); Yun-Min Liu, Changhua County (TW)

(73) Assignees: YUAN ZE UNIVERSITY, Taoyuan (TW); HOMYTECH CO., LTD., Taoyuan (TW)

( * ) Notice: Subject to any disclaimer, the term of this patent is extended or adjusted under 35 U.S.C. 154(b) by 53 days.

(21) Appl. No.: 15/980,357

(22) Filed: May 15, 2018

(65) Prior Publication Data

US 2018/0261867 A1  Sep. 13, 2018

Related U.S. Application Data

(63) Continuation-in-part of application No. 14/720,776, filed on May 23, 2015, now abandoned.

(30) Foreign Application Priority Data

Oct. 24, 2014  (TW) .............................. 103136855 A

(51) Int. Cl.
*H01M 8/1004* (2016.01)
*C25B 1/04* (2006.01)
*H01M 4/88* (2006.01)

(52) U.S. Cl.
CPC ............. *H01M 8/1004* (2013.01); *C25B 1/04* (2013.01); *H01M 4/8807* (2013.01)

(58) Field of Classification Search
CPC ............................... H01M 8/1004; C25B 1/04
See application file for complete search history.

(56) References Cited

U.S. PATENT DOCUMENTS

2005/0191537 A1* 9/2005 Belchuk .............. H01M 8/0273
429/428

OTHER PUBLICATIONS

.Y. Lee and R.D. Huang, Real-time determination of temperature and voltage of fuel cells by suing flexible micro sensors in a membrane electrode assembly, 37 International Journal of Hydrogen Energy 2012, 3459-65. (Year: 2012 ).*

* cited by examiner

*Primary Examiner* — Luan V Van
*Assistant Examiner* — Caitlyn Mingyun Sun
(74) *Attorney, Agent, or Firm* — Li & Cai Intellectual Property (USA) Office

(57) ABSTRACT

A membrane-electrode assembly for water electrolysis including a proton-exchange membrane, a first catalyst layer, a second catalyst layer, a first gas diffusion layer, a second gas diffusion layer and a first sensor chip. The proton-exchange membrane is disposed between an inner side of the first catalyst layer and an inner side of the second catalyst layer. The first gas diffusion layer is disposed on an outer side of the first catalyst layer. The second gas diffusion layer is disposed on an outer side of the second catalyst layer. The first sensor chip is sandwiched between the first catalyst layer and the first gas diffusion layer to sense an environmental change where water electrolysis takes place.

11 Claims, 8 Drawing Sheets

MEMBRANE-ELECTRODE ASSEMBLY FOR WATER ELECTROLYSIS

This Application is a continuation in part application of prior U.S. application Ser. No. 14/720,776 filed on May 23, 2015, the entire contents of which are incorporated herein by reference.

BACKGROUND

1. Technical Field

The present disclosure generally relates to a membrane-electrode assembly for water electrolysis and, more particularly, to a membrane-electrode assembly with a sensor device disposed therein so as to sense an environmental change where water electrolysis takes place.

2. Description of Related Art

With the rapid development of industry, people have been speeding up consumption of fossil energy resources. This results in critical shortage of fossil energy sources as well as deterioration of the ecological environment. Therefore, it has been a main technology trend to develop high-efficiency and low-pollution renewable energy sources to replace fossil energy sources.

Among renewable energy sources, a fuel cell is a device that converts the chemical energy from a fuel into electricity through a chemical reaction with oxygen or another oxidizing agent. In addition to electricity, fuel cells produce water and heat and are thus more environment-friendly. Compared with green energies such as solar energy and wind power, fuel cells are less weather-dependent and more stable in providing electricity. Accordingly, fuel cells have become an indispensable renewable energy source.

Among the renewable clean energy sources, hydrogen is viewed as the most potential energy carrier because it is clean and harmless to the environment. According to the state-of-the-art hydrogen preparation technologies, a proton-exchange membrane (PEM) is often used to prepare hydrogen with high efficiency. In a water electrolysis apparatus, water is added and a direct current is conducted between the anode and the cathode so that gaseous oxygen and hydrogen ions are produced due to electrochemical reactions at the anode and the hydrogen ions flow through the proton-exchange membrane to the cathode to acquire electrons and to be reduced to gaseous hydrogen.

It should be noted that the water electrolysis efficiency is affected by the environmental change such as the variations of temperature, pressure, voltage and current during the electrochemical reactions in the water electrolysis apparatus. Accordingly, how the environmental change is measured has become important.

SUMMARY

The present disclosure provides a membrane-electrode assembly for water electrolysis. The membrane-electrode assembly includes a sensor device disposed therein so as to sense an environmental change such as the variation in temperature, pressure, voltage and/or current where water electrolysis takes place.

One embodiment of the present disclosure provides a membrane-electrode assembly for water electrolysis, including a proton-exchange membrane, a first catalyst layer, a second catalyst layer, a first gas diffusion layer, a second gas diffusion layer and a first sensor chip. The proton-exchange membrane is disposed between an inner side of the first catalyst layer and an inner side of the second catalyst layer. The first gas diffusion layer is disposed on an outer side of the first catalyst layer. The second gas diffusion layer is disposed on an outer side of the second catalyst layer. The first sensor chip is sandwiched between the first catalyst layer and first gas diffusion layer to sense an environmental change where water electrolysis takes place.

One embodiment of the present disclosure further provides a membrane-electrode assembly for water electrolysis, including a proton-exchange membrane, a first catalyst layer, a second catalyst layer, a first gas diffusion layer, a second gas diffusion layer, a first packaging rim and a second packaging rim. The proton-exchange membrane is disposed between an inner side of the first catalyst layer and an inner side of the second catalyst layer. The first gas diffusion layer is disposed on an outer side of the first catalyst layer. An inner side of the first gas diffusion layer corresponds to the outer side of the first catalyst layer. The second gas diffusion layer is disposed on an outer side of the second catalyst layer. An inner side of the second gas diffusion layer corresponds to the outer side of the second catalyst layer. The first packaging rim is disposed on an outer side of the first gas diffusion layer. The first packaging rim includes a first rim portion and a first sensor portion. The first sensor portion is extended from the first rim portion to the first gas diffusion layer to sense an environmental change of the first gas diffusion layer where water electrolysis takes place. The second packaging rim is disposed on an outer side of the second gas diffusion layer.

One embodiment of the present disclosure further provides a membrane-electrode assembly for water electrolysis, including a proton-exchange membrane, a first catalyst layer, a second catalyst layer and a first sensor chip. The proton-exchange membrane is disposed between an inner side of the first catalyst layer and an inner side of the second catalyst layer. The first sensor chip is sandwiched between the first catalyst layer and the proton-exchange membrane so that the first sensor chip senses an environmental change where water electrolysis takes place.

As stated above, the membrane-electrode assembly for water electrolysis in one embodiment of the present disclosure includes at least one sensor device therein. The sensor device senses an environmental change where water electrolysis takes place and transmits the sensed signal to an external surveillance device so that the surveillance device performs microscopic diagnosis and analysis on the membrane-electrode assembly.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

While such terms as "first," "second," etc., may be used to describe various components, such components must not be limited to the above terms. The above terms are used only to distinguish one component from another. For example, a second component may be referred to as a first component within the scope of the present disclosure, and similarly, the first component may be referred to as the second component. As used herein, the term "and/or" includes any and all combinations of one or more of the associated listed items.

Embodiment of Membrane-Electrode Assembly for Water Electrolysis

Figure 1:
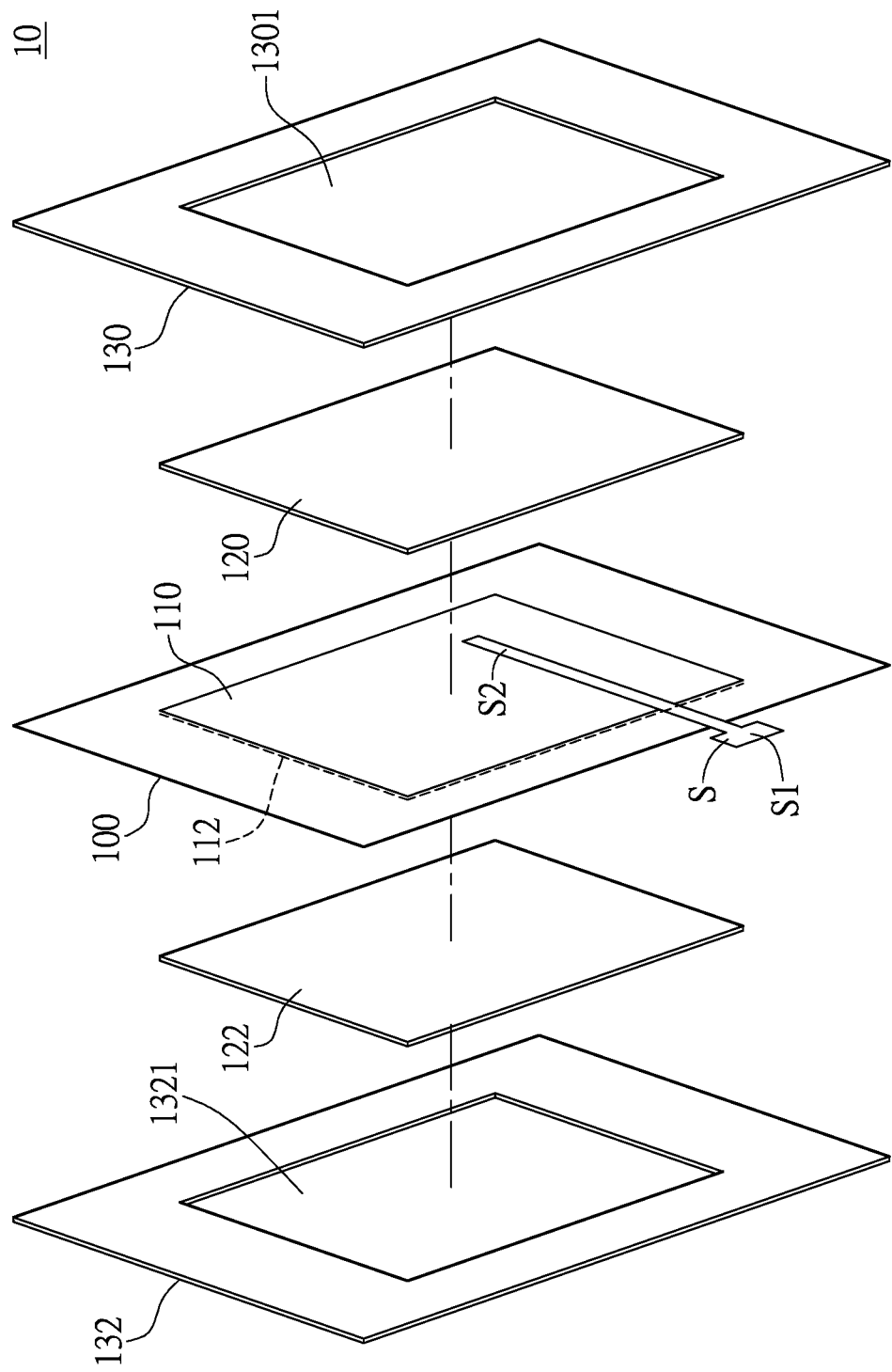
FIG. 1 is a schematic diagram of a membrane-electrode assembly for water electrolysis according to one embodiment of the present disclosure.

With reference to FIG. 1, FIG. 1 is a schematic diagram of a membrane-electrode assembly for water electrolysis according to one embodiment of the present disclosure. The membrane-electrode assembly for water electrolysis 10 includes a proton-exchange membrane 100, a first catalyst layer 110, a second catalyst layer 112, a first gas diffusion layer 120, a second gas diffusion layer 122, a first packaging rim 130, a second packaging rim 132 and a sensor chip S. As shown in FIG. 1, the proton-exchange membrane 100 is disposed between an inner side of the first catalyst layer 110 and an inner side of the second catalyst layer 112. The proton-exchange membrane 100, the first catalyst layer 110 and the second catalyst layer 112 are sandwiched between an inner side of the first gas diffusion layer 120 and an inner side of the second gas diffusion layer 122. The sensor chip S is sandwiched between an outer side of the first catalyst layer 110 and the inner side of the first gas diffusion layer 120. The first packaging rim 130 and the second packaging rim 132 are disposed, respectively, on an outer side of the first gas diffusion layer 120 and an outer side of the second gas diffusion layer 122 so as to package the proton-exchange membrane 100, the sensor chip S, the first catalyst layer 110, the second catalyst layer 112, the first gas diffusion layer 120 and the second gas diffusion layer 122. More particularly, the sensor chip S is partially exposed outside the first packaging rim 130 and the second packaging rim 132. The outer side of the first gas diffusion layer 120 and the outer side of the second gas diffusion layer 122 are exposed, respectively, through the empty portion 1301 of the first packaging rim 130 and the empty portion 1321 of the second packaging rim 132.

In the present embodiment, the first catalyst layer 110 and the second catalyst layer 112 may be formed by coating on both sides of the proton-exchange membrane 100. Also, the size of the first catalyst layer 110 and the size of the second catalyst layer 112 correspond, respectively, to the size of the first gas diffusion layer 120 and the size of the second gas diffusion layer 122. The proton-exchange membrane 100 may include solid-state polymer for transmitting protons (such as hydrogen ions H+). The first catalyst layer 110 and the second catalyst layer 112 are catalysts for the cathode and the anode, respectively. The cathode catalyst may include catalysts such as Pt or Ru, and the anode catalyst may include catalysts such as $IrO_2$ or $RuO_2$. The first gas diffusion layer 120 corresponding to the first catalyst layer 110 (i.e., the cathode catalyst) may include porous graphite felt or carbon felt, and the second gas diffusion layer 122 corresponding to the second catalyst layer 112 (i.e., the anode catalyst) may also include porous graphite felt or carbon felt. The first packaging rim 130 and the second packaging rim 132 may include thermoplastic polymer such as polyethylene (PE), polypropylene (PP), polytetrafluoroethene (PTFE), PVDF, EPDM, polyester, polyamide (PA), polyamide (PA), polyimide (PI), polyurethane (PU) and silicone.

It should be noted that the present disclosure is not limited to the previous examples of the sizes and types of the proton-exchange membrane 100, the first catalyst layer 110, the second catalyst layer 112, the first gas diffusion layer 120, the second gas diffusion layer 122, the first packaging rim 130 and the second packaging rim 132. The person with ordinary skill in the art may make modifications according to practical demands.

The sensor chip S includes a sensor portion S2 and a connection portion S1. The sensor portion S2 includes a sensor device (not shown) therein. The sensor device is electrically coupled to the connection portion S1. The sensor device can sense an environmental change such as a variation of temperature, voltage, current or/and pressure where water electrolysis takes place. The connection portion S1 is exposed outside the first packaging rim 130 and the second packaging rim 132, and can be implemented by a conductive output port (such as a conductive pad made of metal), for connecting an external surveillance device (not shown). The connection portion S1 transmits the sensed signal from the sensor portion S2 to the external surveillance device (not shown) so that the surveillance device can perform real-time microscopic diagnosis and analysis on the membrane-electrode assembly according to the sensed signal from the sensor portion S2.

In the present embodiment, the sensor device included in the sensor portion S2 may be implemented by a flexible micro sensor for sensing temperature, current, voltage and/or pressure or an all-in-one micro sensor for sensing all of the above. The present disclosure is not limited to the number and the types of micro sensors included in the sensor portion S2. It should be noted that the micro sensor is implemented by a metal sensor circuit fabricated by microelectromechanical system (MEMS) technology to exhibit compactness and thinness. The sensor circuit may employ a stainless steel sheet as a flexible substrate and high temperature resistant polyimide (PI) as a protection layer, to which the present disclosure is not limited.

It should be also noted that the present disclosure is not limited to the number of sensor chips S included in the membrane-electrode assembly 10. In other words, there may be a plurality of sensor chips S disposed between the first catalyst layer 110 and the first gas diffusion layer 120 so as to sense various environmental changes where water electrolysis takes place between the first catalyst layer 110 and the first gas diffusion layer 120.

In another embodiment, there may further be at least one sensor chip S disposed between the second catalyst layer 112 and the second gas diffusion layer 122 so as to sense at least one environmental change where water electrolysis takes place between the second catalyst layer 112 and the second gas diffusion layer 122.

Accordingly, by providing a plurality of sensor chips S between catalyst layers and gas diffusion layers, the surveillance device may perform real-time microscopic diagnosis and analysis on the environmental change such as variations of temperature, pressure, voltage and/or current on the membrane-electrode assembly 10 according to the sensed signal from the sensor chips S during electrochemical reactions.

Another Embodiment of Membrane-Electrode Assembly for Water Electrolysis

Figure 2:
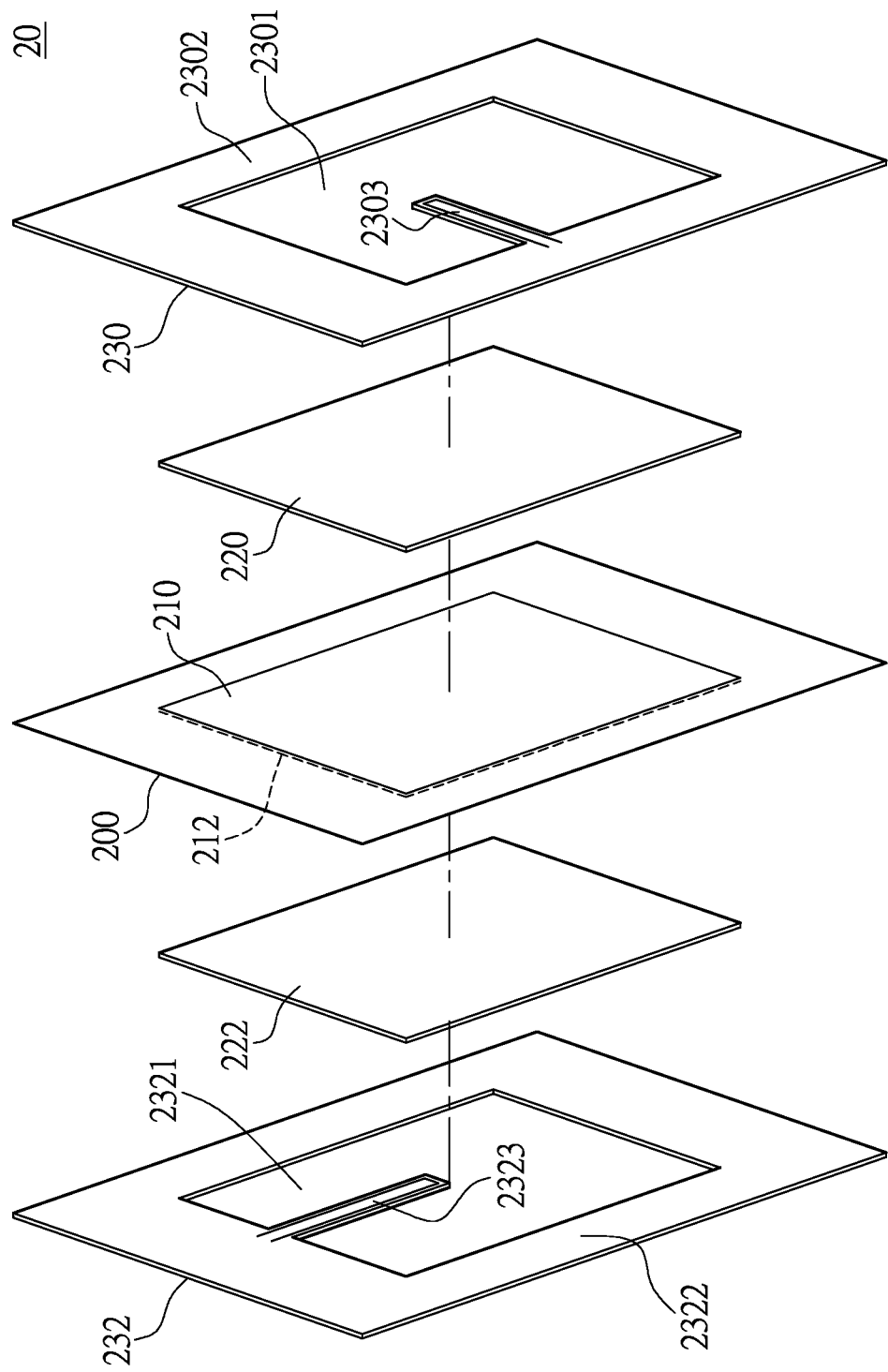
FIG. 2 is a schematic diagram of a membrane-electrode assembly for water electrolysis according to another embodiment of the present disclosure.

With reference to FIG. 2, FIG. 2 is a schematic diagram of a membrane-electrode assembly for water electrolysis according to another embodiment of the present disclosure. The membrane-electrode assembly for water electrolysis 20 includes a proton-exchange membrane 200, a first catalyst layer 210, a second catalyst layer 212, a first gas diffusion layer 220, a second gas diffusion layer 222, a first packaging rim 230 and a second packaging rim 232. As shown in FIG. 2, the proton-exchange membrane 200 is disposed between an inner side of the first catalyst layer 210 and an inner side of the second catalyst layer 212. The proton-exchange membrane 200, the first catalyst layer 210 and the second catalyst layer 212 are sandwiched between an inner side of the first gas diffusion layer 220 and an inner side of the second gas diffusion layer 222. The first packaging rim 230 and the second packaging rim 232 are disposed, respectively, on an outer side of the first gas diffusion layer 220 and an outer side of the first gas diffusion layer 222 so as to package the proton-exchange membrane 200, the first catalyst layer 210, the second catalyst layer 212, the first gas diffusion layer 220 and the second gas diffusion layer 222. The outer side of the first gas diffusion layer 220 and the outer side of the second gas diffusion layer 222 are exposed, respectively, through the empty portion 2301 of the first packaging rim 230 and the empty portion 2321 of the second packaging rim 232.

The present embodiment is different from the previous embodiment in FIG. 1 in that the membrane-electrode assembly 20 does not include a sensor chip S. Instead, the membrane-electrode assembly 20 includes a sensor portion 2303 extended from the rim portion 2302 of the first packaging rim 230. The sensor portion 2303 extended from the rim portion 2302 to the first gas diffusion layer 220 senses an environmental change where water electrolysis takes place. In other words, the sensor portion 2303 can sense the environmental change of the first gas diffusion layer 220. Moreover, the second packaging rim 232, like the first packaging rim 230, may also include a sensor portion 2323 extended from the rim portion 2322. The sensor portion 2323 extended from the rim portion 2322 to the second gas diffusion layer 220 senses an environmental change of the second gas diffusion layer 222 where water electrolysis takes place.

It should be noted that the present disclosure is not limited to the number of the sensor portions 2303 included in the first packaging rim 230 or the number of the sensor portions 2323 included in the second packaging rim 232. In other words, a plurality of sensor portions 2303 may be extended from the rim portion 2302 or a plurality of sensor portions 2323 may be extended from the rim portion 2322 so as to sense the environmental changes of the first gas diffusion layer 220 or the second gas diffusion layer 222 where water electrolysis takes place. In another embodiment, the second packaging rim 232 does not necessarily include the sensor portion 2323. The present disclosure is not limited to the previous examples of the membrane-electrode assembly 20.

It should be noted that the membrane-electrode assembly 20 has been described in details with reference to FIG. 1 and is not repeated herein.

Still Another Embodiment for Membrane-Electrode Assembly for Water Electrolysis

Figure 3:
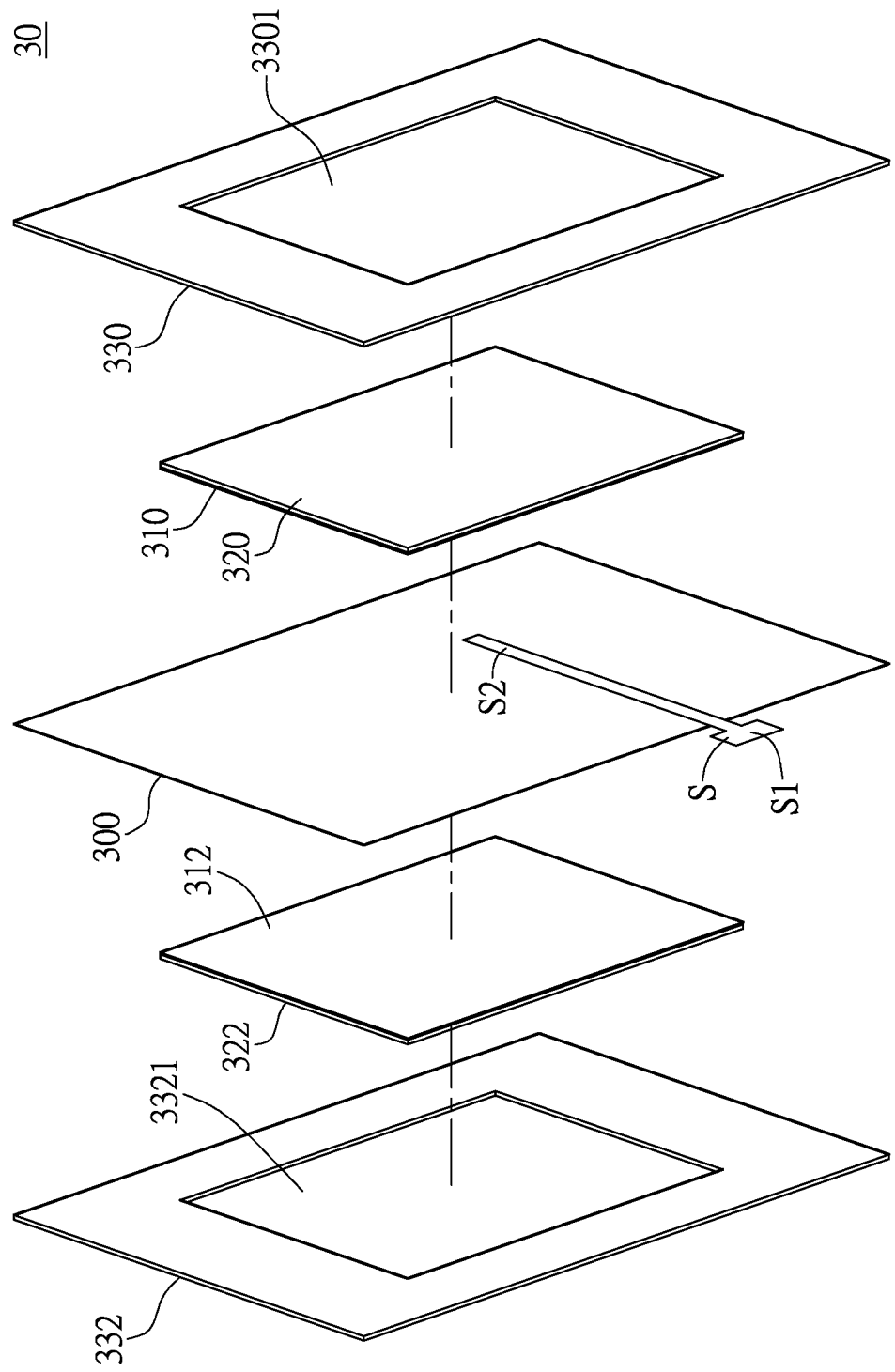
FIG. 3 is a schematic diagram of a membrane-electrode assembly for water electrolysis according to still another embodiment of the present disclosure.

With reference to FIG. 3, FIG. 3 is a schematic diagram of a membrane-electrode assembly for water electrolysis according to still another embodiment of the present disclosure. The membrane-electrode assembly for water electrolysis 30 includes a proton-exchange membrane 300, a first catalyst layer 310, a second catalyst layer 312, a first gas diffusion layer 320, a second gas diffusion layer 322, a first packaging rim 330, a second packaging rim 332 and a sensor chip S. As shown in FIG. 3, the proton-exchange membrane 300 is disposed between the first catalyst layer 310 and the second catalyst layer 312. The proton-exchange membrane 300, the first catalyst layer 310 and the second catalyst layer 312 are sandwiched between an inner side of the first gas diffusion layer 320 and an inner side of the second gas diffusion layer 322. The first packaging rim 330 and the second packaging rim 332 are disposed, respectively, on an outer side of the first gas diffusion layer 320 and an outer side of the second gas diffusion layer 322 so as to package the proton-exchange membrane 300, the sensor chip S, the first catalyst layer 310, the second catalyst layer 312, the first gas diffusion layer 320 and the second gas diffusion layer 322. The sensor chip S is partially exposed outside the first packaging rim 330 and the second packaging rim 332. The outer side of the first gas diffusion layer 320 and the outer side of the second gas diffusion layer 322 are exposed, respectively, through the empty portion 3301 of the first packaging rim 330 and the empty portion 3321 of the second packaging rim 332.

The present embodiment is different from the previous embodiment in FIG. 1 in that the sensor chip S is sandwiched between the proton-exchange membrane 300 and the first catalyst layer 310 and that the first catalyst layer 310 and the second catalyst layer 312 are formed by filtering printing, respectively, on a side of the first gas diffusion layer 320 and on a side of the second gas diffusion layer 322. The sensor chip S can sense an environmental change where water electrolysis takes place. In other words, the sensor chip S can sense an environmental change between the proton-exchange membrane 300 and the first catalyst layer 310.

It should be noted that the present disclosure is not limited to the number of sensor chips S included in the membrane-electrode assembly 30. In other words, there may be a plurality of sensor chips S provided between the proton-exchange membrane 300 and the first catalyst layer 310 so as to sense the environmental change where water electrolysis takes place between the proton-exchange membrane 300 and the first catalyst layer 31.

In another embodiment, there may further be at least one sensor chip S between the proton-exchange membrane 300 and the second catalyst layer 312 so as to sense an environmental change where water electrolysis takes place between the proton-exchange membrane 300 and the second catalyst layer 312.

As stated above, by providing a plurality of sensor chips S between catalyst layers and gas diffusion layers, the surveillance device may perform real-time microscopic diagnosis and analysis on the environmental change such as variations of temperature, pressure, voltage and/or current on the membrane-electrode assembly 30 according to the sensed signal from the sensor chips S during electrochemical reactions.

Figure 4:
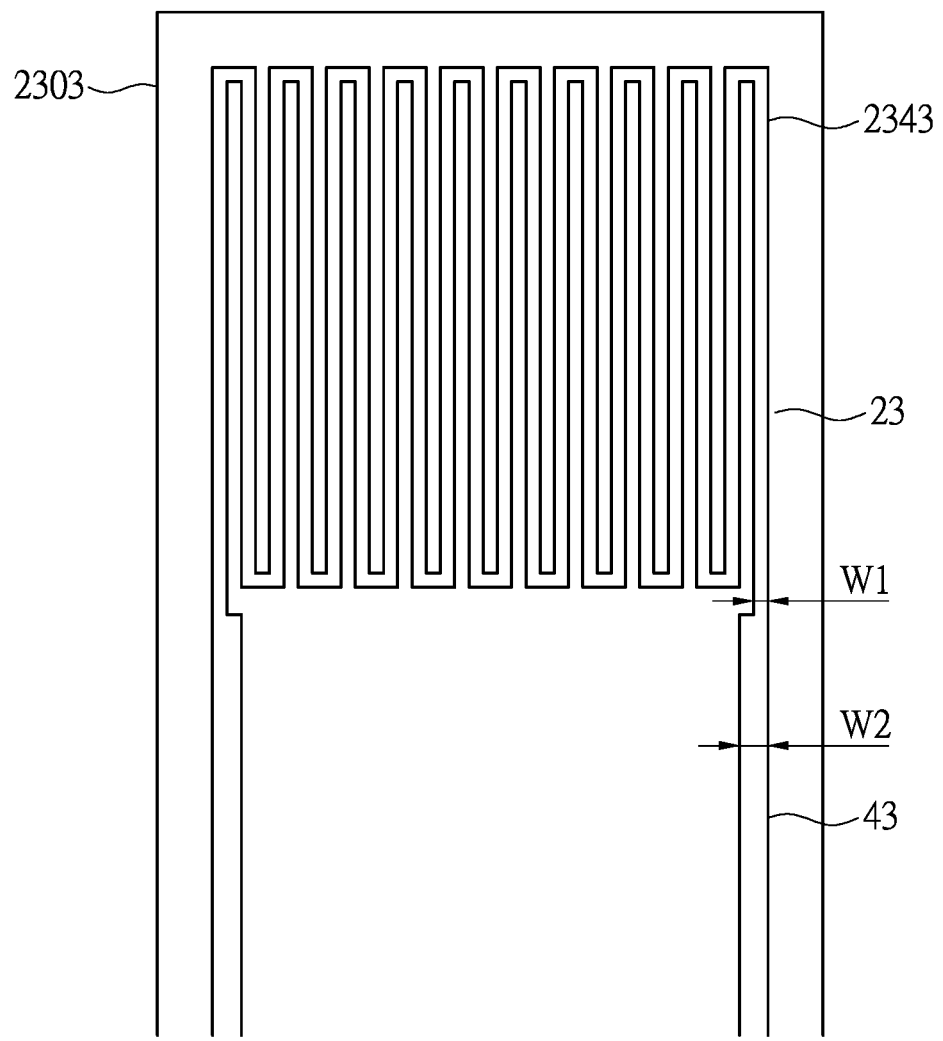
FIG. 4 is a schematic diagram of a sensor device included in a sensor portion according to still another embodiment of the present disclosure.

In another embodiment as shown in FIG. 4, a sensor device 2343 included in the sensor portion 2303 is formed by multi-U-type lines 23, A sensing principle of the sensor device 2343 is that when the ambient temperature rises, a resistivity of the sensor device 2343 increases. The sensor device 2343 transmits the sensed signal related to a linear variation of the resistance with temperature from the sensor portion 2303 to the external surveillance device by two conductive lines 43. A width W1 of one U-type line 23 is less than a width W2 of one of the conductive lines 43, such that a sensitivity of a resistance variation for sensing various environmental changes at the sensor device 2343 is increased, and conversely, a sensitivity of the two conductive lines 43 is decreased For example, the width W1 of the U-type line 23 is ½ of the width W2 of the conductive line 43. However, the present disclosure is not limited thereto.

Figure 5A:
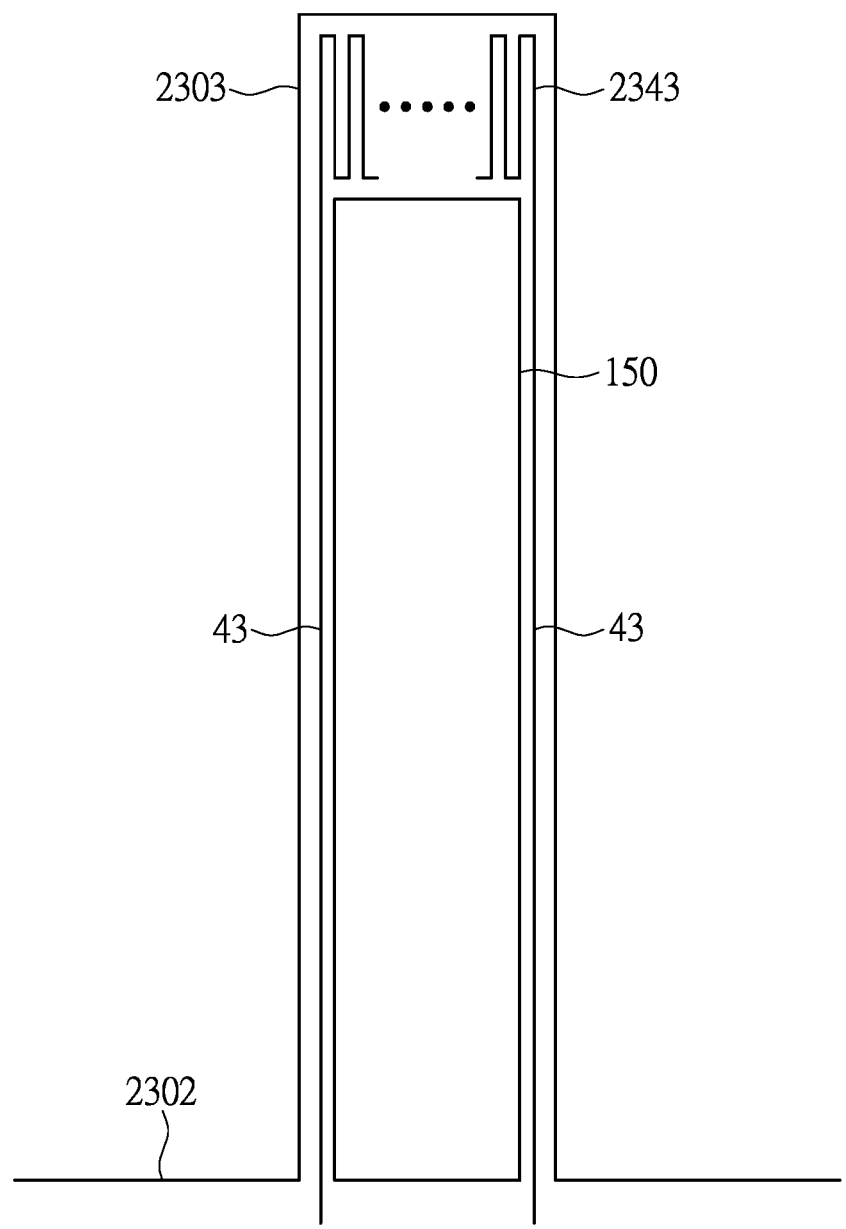
FIG. 5A is a schematic diagram to show a shape of a sensor portion according to still another embodiment of the present disclosure.
Figure 5B:
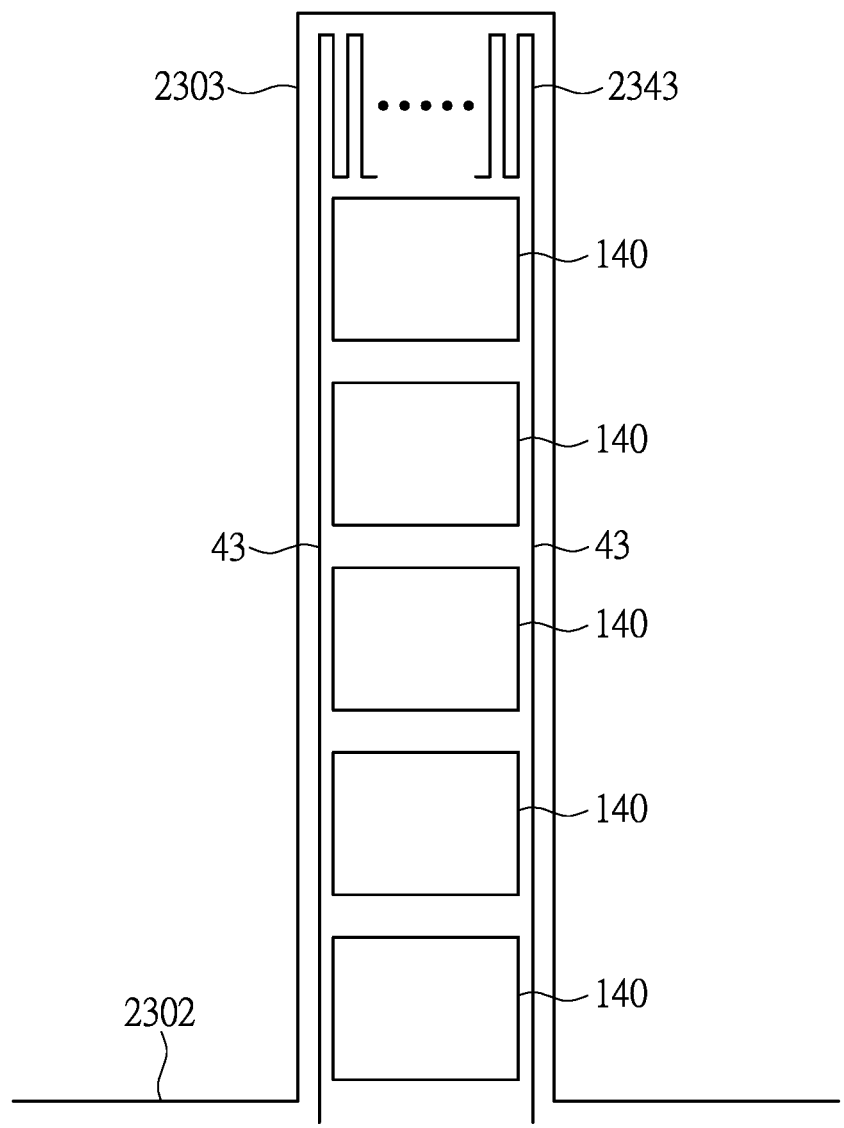
FIG. 5B is a schematic diagram of a plurality of holes equidistantliy arranged on a sensor portion according to still another embodiment of the present disclosure.

In another embodiment as shown in FIG. 5A, the sensor portion 2303 has a shape which is formed according to the multi-U-type lines 23 and the two conductive lines 43 to generate a hole 150 and reduce an area of the sensor portion 2303, so that the gas easily diffuses and the area of the sensor portion 2303 affecting the reactions efficiency is reduced. In another embodiment as shown in FIG. 5B. the sensor portion 2303 has a plurality of holes 140 equidistantly arranged on the sensor portion 2303 to reduce an area of the sensor portion 2303, so that the gas easily diffuses and the area of the sensor portion 2303 affecting the reactions efficiency is reduced. It should be noted that the present disclosure is not limited to the previous examples of the shape and the area of the sensor portion 2303 and the shape of the sensor device 2343. A person of ordinary skill in the art may still make modifications according to practical demands based on the present disclosure.

Figure 6:
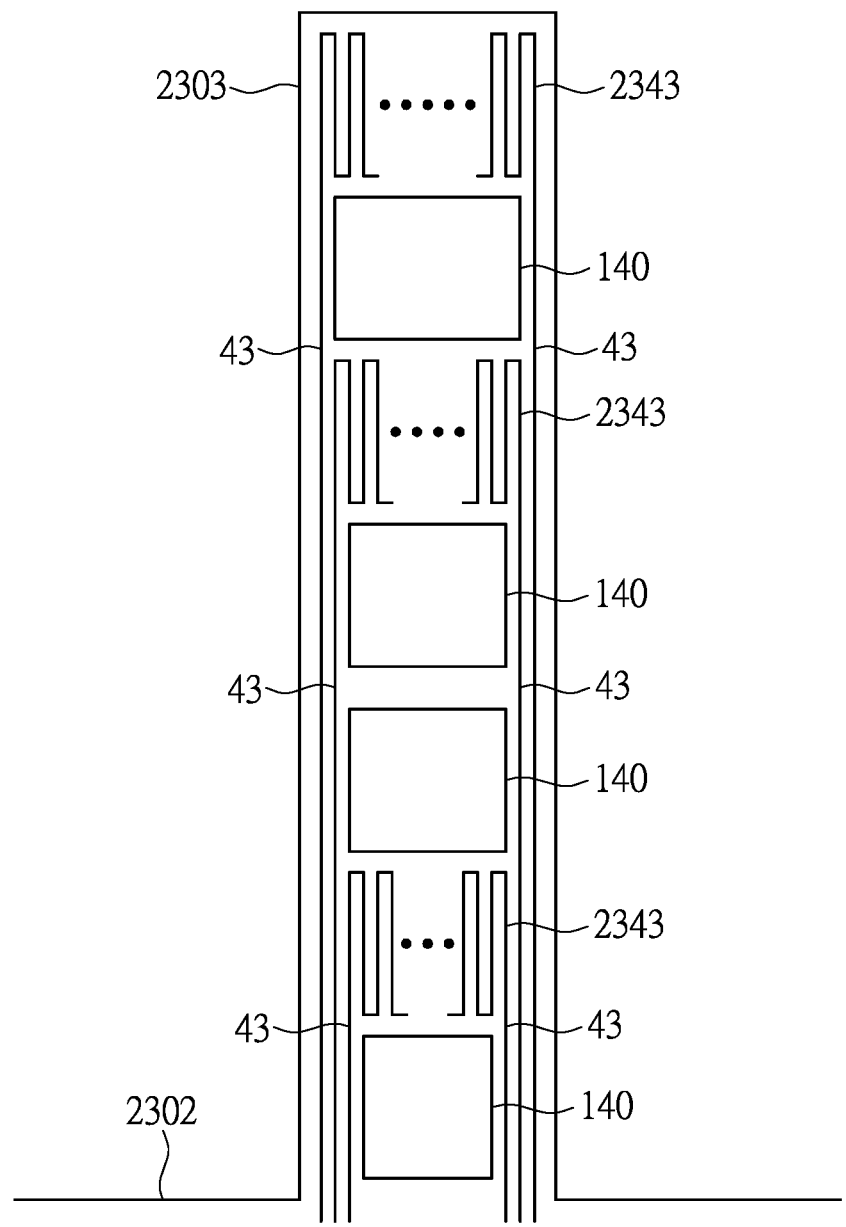
FIG. 6 is a schematic diagram of sensor devices allocated at different locations on a sensor portion according to still another embodiment of the present disclosure.

In another embodiment, the sensor portion 2303 has the sensor devices 2343 allocated at different locations on the sensor portion 2303 to sense variations of temperature, pressure, voltage and/or current on the membrane-electrode assembly 20. As shown in FIG. 6, the sensor portion 2303 has, for example, three sensor devices 2343 allocated at different locations on the sensor portion 2303 to sense various environmental changes on the membrane-electrode assembly 20. However, the number of the sensor devices 2343 on the sensor portion 2303 is not limited thereto. A person of ordinary skill in the art may still make modifications according to practical demands based on the present disclosure.

Figure 7:
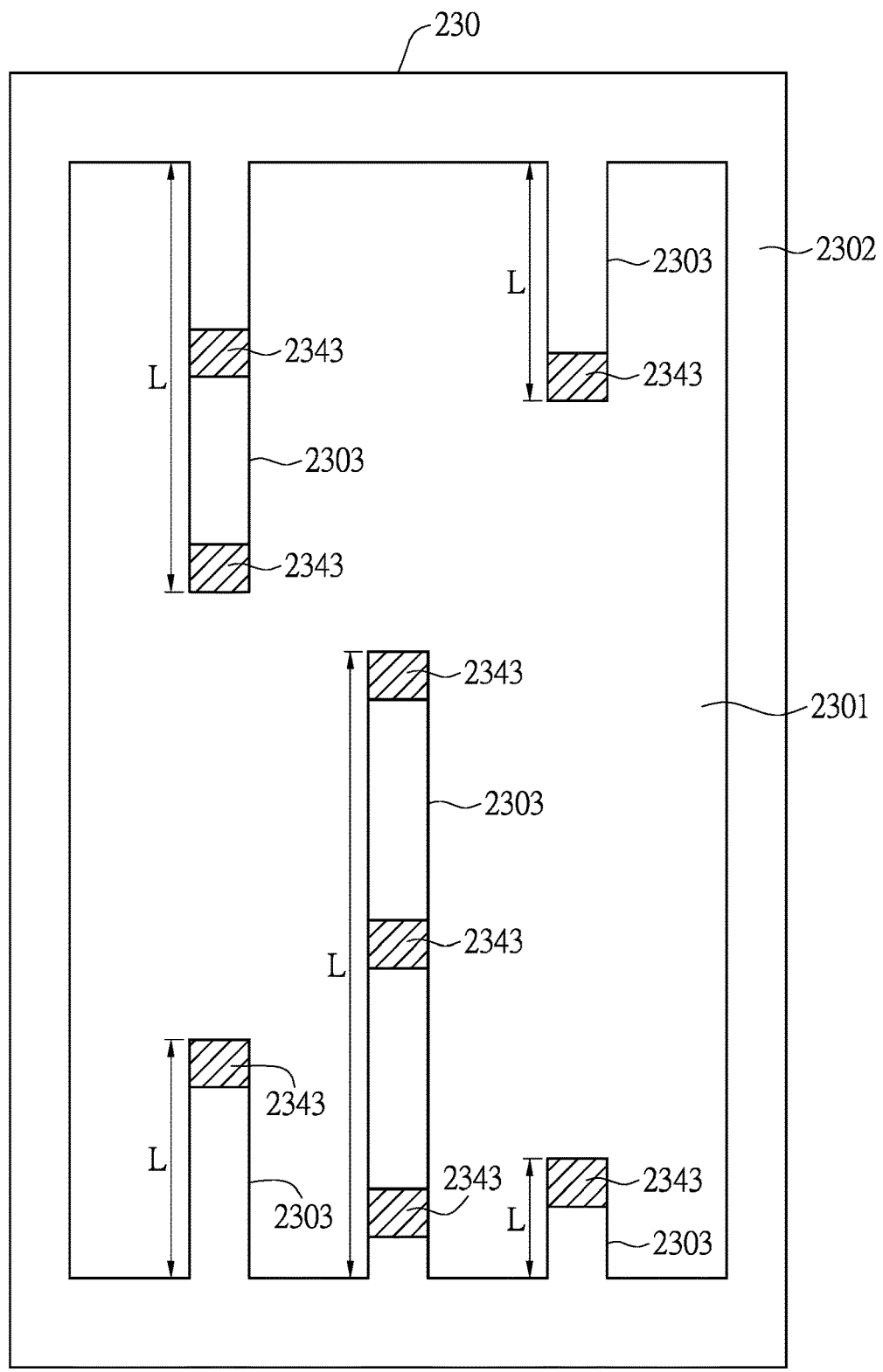
FIG. 7 is a schematic diagram of a plurality of sensor portions having different lengths and extended from a rim portion of a first packaging rim according to still another embodiment of the present disclosure.

In another embodiment as shown in FIG. 7, a length L of each of the plurality of the sensor portions 2303 extended from the rim portion 2302 of the first packaging rim 230 is different from each other, so that the sensor portions 2303 sense various environmental changes in various locations. However, the number of the sensor portions 2303 included in the first packaging rim 230 is not limited thereto.

Functions of Embodiments

Accordingly, the membrane-electrode assembly for water electrolysis in one embodiment of the present disclosure includes at least one sensor device therein. The sensor device senses an environmental change during water electrolysis and transmits the sensed signal to an external surveillance device so that the surveillance device performs microscopic diagnosis and analysis on the membrane-electrode assembly.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:
1. A membrane-electrode assembly for water electrolysis, comprising:
  a first catalyst layer;
  a second catalyst layer;
  a proton-exchange membrane disposed between an inner side of said first catalyst layer and an inner side of said second catalyst layer;
  a first gas diffusion layer disposed on an outer side of said first catalyst layer, wherein an inner side of said first gas diffusion layer corresponds to said outer side of said first catalyst layer;
  a second gas diffusion layer disposed on an outer side of said second catalyst layer, wherein an inner side of said second gas diffusion layer corresponds to said outer side of said second catalyst layer;
  a first packaging rim disposed on an outer side of said first gas diffusion layer, said first packaging rim comprising a first rim portion and first sensor portions, said first sensor portions being extended from said first rim portion to said first gas diffusion layer to sense an environmental change of said first gas diffusion layer where water electrolysis takes place; and
  a second packaging rim disposed on an outer side of said second gas diffusion layer;
  wherein each of said first sensor portions has sensor devices which are formed by multi-U-type lines, wherein a width of one of said multi-U-type lines is less than a width of a conductive line for transmitting a sensed signal from said first sensor portion to a surveillance device;
  wherein a shape of each of said first sensor portions is formed according to said multi-U-type lines and two conductive lines to generate a hole and reduce an area of said first sensor portion;
  wherein said sensor devices are allocated at different locations on each of said first sensor portions; and wherein said first sensor portions extended from the first rim portion of the first packaging rim have different lengths.

2. The membrane-electrode assembly of claim 1, wherein said second packaging rim comprises a second rim portion and a second sensor portion, said second sensor portion being extended from said second rim portion to said second gas diffusion layer to sense an environmental change of said second gas diffusion layer where water electrolysis takes place.

3. The membrane-electrode assembly of claim 1, wherein said environmental change is a variation in temperature, voltage, current or pressure.

4. A membrane-electrode assembly for water electrolysis, comprising:
   a first catalyst layer;
   a second catalyst layer;
   a proton-exchange membrane disposed between an inner side of said first catalyst layer and an inner side of said second catalyst layer;
   a first gas diffusion layer disposed on an outer side of said first catalyst layer, wherein an inner side of said first gas diffusion layer corresponds to said outer side of said first catalyst layer;
   a second gas diffusion layer disposed on an outer side of said second catalyst layer, wherein an inner side of said second gas diffusion layer corresponds to said outer side of said second catalyst layer;
   a first packaging rim disposed on an outer side of said first gas diffusion layer, said first packaging rim comprising a first rim portion and first sensor portions, said first sensor portions being extended from said first rim portion to said first gas diffusion layer to sense an environmental change of said first gas diffusion layer where water electrolysis takes place; and
   a second packaging rim disposed on an outer side of said second gas diffusion layer;
   wherein each of said first sensor portions has sensor devices which are formed by multi-U-type lines, wherein a width of one of said multi-U-type lines is less than a width of a conductive line for transmitting a sensed signal from said first sensor portion to a surveillance device;
   wherein each of said first sensor portions has a plurality of holes equidistantly arranged on said first sensor portion to reduce an area of said first sensor portion;
   wherein said sensor devices are allocated at different locations on each of said first sensor portions; and
   wherein said first sensor portions extended from the first rim portion of the first packaging rim have different lengths.

5. The membrane-electrode assembly of claim 4, wherein said second packaging rim comprises a second rim portion and a second sensor portion, said second sensor portion being extended from said second rim portion to said second gas diffusion layer to sense an environmental change of said second gas diffusion layer where water electrolysis takes place.

6. The membrane-electrode assembly of claim 4, wherein said environmental change is a variation in temperature, voltage, current or pressure.

7. A membrane-electrode assembly for water electrolysis, comprising:
   a first catalyst layer;
   a second catalyst layer;
   a proton-exchange membrane disposed between an inner side of said first catalyst layer and an inner side of said second catalyst layer;
   a first gas diffusion layer disposed on an outer side of said first, catalyst layer, wherein an inner side of said first gas diffusion layer corresponds to said outer side of said first catalyst layer;
   a second gas diffusion layer disposed on an outer side of said second catalyst layer, wherein an inner side of said second gas diffusion layer corresponds to said outer side of said second catalyst layer;
   a first packaging rim disposed on an outer side of said first gas diffusion layer, said first packaging rim comprising a first rim portion and a first sensor portion, said first sensor portion being extended from said first rim portion to said first gas diffusion layer to sense an environmental change of said first gas diffusion layer where water electrolysis takes place; and
   a second packaging rim disposed on an outer side of said second gas diffusion layer;
   wherein said first sensor portion has sensor devices which is formed by multi-U-type lines, wherein a width of one of said multi-U-type lines is less than a width of a conductive line for transmitting a sensed signal from said first sensor portion to a surveillance device; and
   wherein said sensor devices are allocated at different locations on said first sensor portion.

8. The membrane-electrode assembly of claim 7, wherein said first sensor portion has a plurality of holes equidistantly arranged on said first sensor portion to reduce an area of said first sensor portion.

9. The membrane-electrode assembly of claim 7, wherein a shape of said first sensor portion is formed according to said multi-U-type lines and two conductive lines to generate a hole and reduce an area of said first sensor portion.

10. The membrane-electrode assembly of claim 7, wherein said second packaging rim comprises a second rim portion and a second sensor portion, said second sensor portion being extended from said second rim portion to said second gas diffusion layer to sense an environmental change of said second gas diffusion layer where water electrolysis takes place.

11. The membrane-electrode assembly of claim 7, wherein said environmental change is a variation in temperature, voltage, current or pressure.

* * * * *